United States Patent [19]

Durham

[11] Patent Number: 4,840,084

[45] Date of Patent: Jun. 20, 1989

[54] FREEWHEEL MECHANISM FOR BICYCLES

[76] Inventor: Roger O. Durham, 1370 Thompson Ave., Glendale, Calif. 91201

[21] Appl. No.: 134,502

[22] Filed: Dec. 17, 1987

[51] Int. Cl.⁴ .............................................. G05G 1/14
[52] U.S. Cl. .................... 74/594.1; 74/594.2; 280/259; 280/261; 192/6 R; 188/26
[58] Field of Search ............ 74/594.1, 143, 594.2, 74/63; 280/236, 259, 260, 261, 264; 192/5, 6 R; 188/26, 24.11

[56] References Cited

U.S. PATENT DOCUMENTS

| 905,343 | 12/1908 | Morrow | 74/594.2 |
|---|---|---|---|
| 2,043,486 | 6/1936 | Muller | 192/6 R |
| 2,473,177 | 6/1949 | Sherwood | 192/6 R |
| 2,531,750 | 11/1950 | Sutton | 188/26 |
| 3,386,544 | 6/1968 | Matsuda | 192/6 R |
| 3,540,309 | 11/1970 | Shimano et al. | 280/260 X |
| 4,183,262 | 1/1980 | Segawa | 280/261 |
| 4,226,310 | 10/1980 | Ozaki | 188/26 X |
| 4,355,706 | 10/1982 | Pan | 280/259 X |
| 4,650,049 | 3/1987 | Stephens | 192/6 R |
| 4,697,469 | 10/1987 | Takimiya et al. | 74/63 |

FOREIGN PATENT DOCUMENTS 486044 8/1952 Canada ...................... 192/6 R

*Primary Examiner*—Richard E. Moore
*Assistant Examiner*—Vinh Luong

[57] ABSTRACT

A freewheel mechanism for bicycles includes a side plate which is easily removed, allowing a sprocket to be quickly replaced without removing the body of the freewheel mechanism from the hub of the bicycle. Since they are not needed in racing, and to facilitate sprocket changes, ball bearings are not used. In the usual manner, a pawl means, and a pawl spring means are disposed between the sprocket and the freewheel body, allowing the sprocket to turn one way only in relation to the freewheel body.

5 Claims, 1 Drawing Sheet

FREEWHEEL MECHANISM FOR BICYCLES

BACKGROUND OF THE INVENTION

This invention pertains to bicycle freewheel mechanisms for single speed bicycle motocross racing bicycles having a roller chain. In the past, such freewheel mechanisms have included an inner freewheel body which engages threads on a rear wheel hub, and an outer freewheel body, including an integral sprocket for engagement with the roller chain. A pair of pawls, and at least one pawl spring have been disposed between said inner and outer freewheel bodies, whereby forward rotation of the outer freewheel body would cause the pawls to engage and drive the inner freewheel body and rear wheel. Also, the pawls would allow the rear wheel to rotate in a forward direction when the outer freewheel body was rotating more slowly or was stopped.

In the past, two rows of steel balls have rotatably supported the outer freewheel body on the inner freewheel body, necessitating the use of hardened steel races, which has mandated steel construction, making previous freewheels unnecessarily heavy for racing purposes.

Also, previous freewheels have been difficult to remove and replace at the track where it is often necessary to rapidly change the rear sprocket for different conditions. A special freewheel removing tool and a long wrench have been needed, because, after some use, the inner freewheel body may become very difficult to loosen.

During a race, the cyclist is either pedalling, or he is braking, but he never coasts. Very small differences in friction are unimportant, because a bicycle motocross race lasts less than a minute When the cyclist is pedalling, a freewheel has no friction, since the two races are locked up, and turn together. When braking, any freewheel friction only helps brake. Since the bicycle motocross racer never coasts, it follows that the extra friction created by the elimination of ball bearings in his freewheel is of no importance whatever. There is no penalty to be paid by the bicycle motocross racer, for not having ball bearings in his freewheel.

However, there are several advantages accruing with their elimination:

1. Without the steel balls, the freewheel doesn't have to have hardened steel races. Instead, it can be made mostly out of aluminum, which weighs about ⅓ as much.

2. If the balls are eliminated, the freewheel can become much simpler in construction, and it can become much easier to clean and oil, inspect, and to replace parts, if needed.

3. If the balls are eliminated, interchanging sprockets can become a much simpler thing to accomplish at the track, and it can be done in a different way, without removing the freewheel body from the hub at all. Special tools could be eliminated.

Thus, there are advantages to be gained in a racing freewheel which eliminates ball bearings. And so they are gained in the freewheel of this invention.

SUMMARY OF THE INVENTION

According to the invention, a freewheel mechanism is shown which does not include ball bearings. Instead, simple sliding contact is provided. This allows the main pieces to be made of aluminum, making them lighter.

A freewheel body is threaded onto a threaded shoulder of a rear hub. The freewheel body has a cylindrical shoulder and a head portion. A pair of pawls are seated on the cylindrical portion of the freewheel body, and are engaged by a pawl spring, which biases the tips of the pawls outwardly from engagement with pawl teeth of a sprocket. The sprocket has a central bore which engages the cylindrical shoulder of the freewheel body, allowing it to rotate thereupon. The central bore of the sprocket is interrupted by a plurality of pawl teeth for engagement with the pawls. A removable side plate and the head of the freewheel body nest and guide the sprocket as it rotates on the cylindrical shoulder. A pair of bolts secure the side plate to the freewheel body.

Trackside sprocket changes are made by (a) removing the wheel from the frame, (b) removing the side plate, (c) replacing one sprocket with another (the pawl spring retains the pawls on the freewheel body when no sprocket is present), (d) replacing the side plate, and (e) replacing the wheel in the frame.

The present invention thus has the following objects:

1. To provide a freewheel mechanism which is simpler, lighter, and easier to use for racing purposes.

2. To provide a freewheel which allows sprockets to be changed without removing the freewheel body, and to allow such sprocket changes to be implemented without special tools.

DETAILED DESCRIPTION

Figure 1:
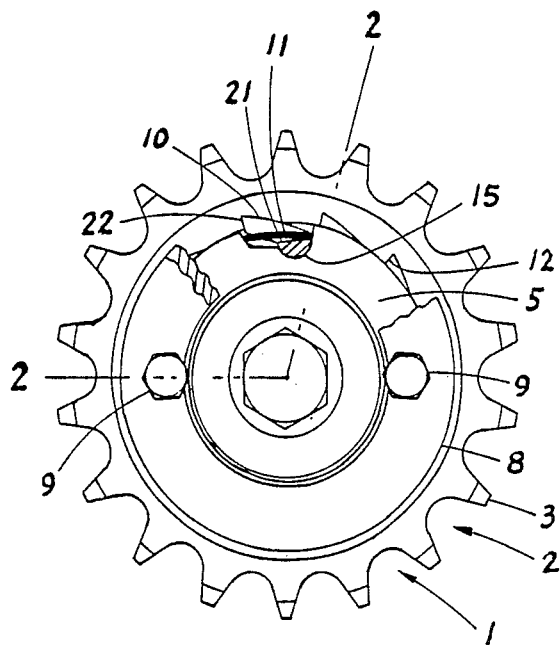
FIG. 1 shows a right side view of a single-speed racing bicycle freewheel mechanism according to the invention.

Referring to FIG. 1, a freewheel mechanism 1 is comprised of a sprocket 2, a freewheel body 5, a side plate 8, a pair of bolts 9, a pawl spring means 11, and a pair of pawl means 10. Said sprocket 2 has teeth 3 which engage the roller chain of a bicycle. Said side plate 8 is partly cut away to show said pawl spring means 11 and one of said pawl means 10. The heads of said pair of bolts 9 are shown. Part of said pawl means 10 is cut away to show said pawl spring means 11.

Said freewheel body 5 is shown to include a pair of pawl seats 15, on which are pivotally seated said pawl means 10.

Said pawl means 10 are normally bifurcated to allow passage of said pawl spring means 11, and to provide a bias surface 21 which coacts with said pawl spring means 11 to present a pair of pawl tips 22 outwardly for engagement with said pawl teeth 12.

Figure 2:
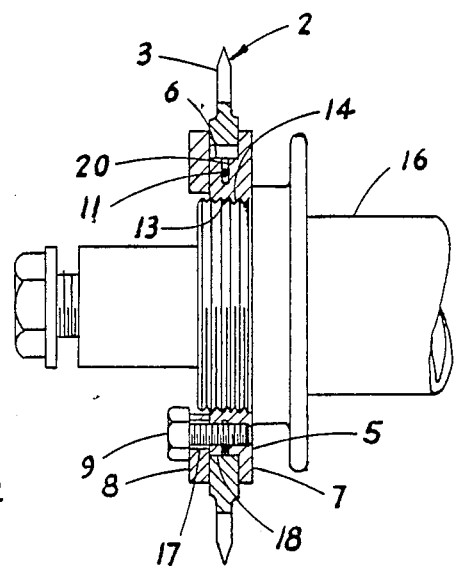
FIG. 2 shows a cross section of the freewheel mechanism, taken along line 2—2 of FIG. 1.

In FIG. 2, said freewheel body 5 is shown to have a cylindrical shoulder 6, and an circumferential pawl spring groove 20 which retains said pawl spring means 11. A pair of threaded holes 18 are provided for engagement with said bolts 9, which secure said side plate 8 to said freewheel body 5. A pair of clearance holes 17 are formed in said side plate 8 for the passage of said bolts 9. Said freewheel body 5 has an internal threading 13 which engages mating external threads 14 on a bicycle hub 16.

Figure 3:
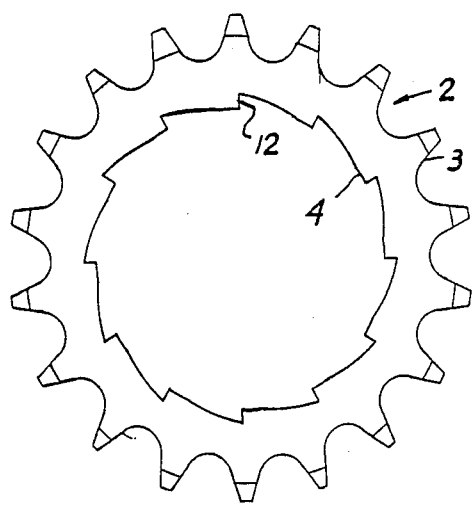
FIG. 3 shows a sprocket by itself.

In FIG. 3, said sprocket 2 is shown to have a central bore 4 which is interrupted by a plurality of pawl teeth 12. Said sprocket bore 4 slides onto said cylindrical shoulder 6 and rotates on it.

Said pawl means 10, said pawl spring 11, coact with said sprocket 2 and said freewheel body 5 to allow said sprocket 2 to turn in only one direction in relation to said freewheel body 5.

MODE OF OPERATION:

As said sprocket 2 is rotated by the roller chain in a clockwise direction during pedalling by the cyclist, the pawl means 10 engages the pawl teeth 12, driving said freewheel body 5 and said hub 16. When the cyclist stops pedalling, said sprocket 2 stops rotating; said hub 16 and said freewheel body 5 may continue to rotate in a forward direction, and the pawl means 10 slide along said central bore 4 and across said pawl teeth 12 without engagement.

Said sprocket 2 can be quickly replaced by another having a different number of teeth by, (a) removing bolts 9 and said sideplate 8, (b) withdrawing said sprocket 2, whilst the pawl means 10 are loosely retained by said pawl spring means 11, (c) inserting another sprocket, and (d) reinstalling said side plate 8 and said bolts 9.

Where said removable side plate 8 is shown to be secured to said freewheel body 5 by a pair of bolts 9, said side plate 8 could alternately be internally threaded to engage coacting external threads which would be formed on said freewheel body 5.

Where the pawl means 10 is shown to be pivotally seated on said pawl seat 15 formed in said freewheel body 5 and engaging pawl teeth 12 in said sprocket 2, the arrangement could be reversed, with the pawl teeth in the freewheel body and the pawl seated in the sprocket and retained by a similar pawl spring means.

Where the pawl spring means 11 has been shown to comprise a partly-circular spring and the pawl means 10 has been shown to comprise a pair of tooth-shaped pawls, many other configurations for both elements are well known and are within the anticipated scope of this invention.

I claim:

1. In combination with a bicycle having a roller chain and having a rotatable rear wheel including a hub having an externally-threaded shoulder, a freewheel mechanism comprising:

(a) a freewheel body having internal threads for engagement with said threaded shoulder of said hub, said freewheel body including a cylindrical shoulder and a head portion;

(b) a removable side plate secured to said freewheel body;

(c) a sprocket rotatably supported on said cylindrical shoulder of said freewheel body, said sprocket having sprocket teeth for engagement with said roller chain, said sprocket nested for guidance between said head portion of said freewheel body and said removable side plate;

(d) a pawl means and pawl spring means disposed between said sprocket and said freewheel body, said pawl means and said pawl spring means coacting with said sprocket and said freewheel body, so as to allow said sprocket to turn in only one direction in relation to said freewheel body.

2. Apparatus according to claim 1, wherein said removable side plate is secured to said freewheel body by a plurality of bolts.

3. Apparatus according to claim 1, wherein said removable side plate is threaded onto mating threads of said freewheel body.

4. Apparatus according to claim 1, wherein said sprocket has a bored central hole for rotating engagement with said cylindrical shoulder of said freewheel body, said bored central hole interrupted by a plurality of teeth adapted for intermittently engaging said pawl means, and wherein said pawl means pivotally engages a pawl seat formed in said freewheel body, and wherein at least one pawl spring means biases said pawl means for engagement with said pawl teeth of said sprocket.

5. Apparatus according to claim 1, wherein said sprocket has a bored central hole for mating engagement with said cylindrical shoulder of said freewheel body, said bored central hole interrupted by at least one pawl seat adapted for pivotally seating a pawl means, wherein said freewheel body has a plurality of pawl teeth in its cylindrical shoulder adapted for engagement with said pawl, means and wherein at least one pawl spring means biases said pawl means for engagement with said pawl teeth of said freewheel body.

* * * * *